June 15, 1926.

R. F. HANCOCK

PROCESS OF MAKING GLASS LETTER PLATES

Filed Feb. 5, 1925

1,588,680

Inventor:
Raymond F. Hancock
By Chindahl Parker & Carlson
Attys.

Patented June 15, 1926.

1,588,680

UNITED STATES PATENT OFFICE.

RAYMOND F. HANCOCK, OF MARION, INDIANA, ASSIGNOR OF ONE-HALF TO JAMES BOYCE, OF LAKETON, MICHIGAN, AND ONE-HALF TO HARRY F. ANDERSON, OF MARION, INDIANA.

PROCESS OF MAKING GLASS LETTER PLATES.

Application filed February 5, 1925. Serial No. 6,951.

This invention relates to the manufacture of embossed letter plates such as are used in the construction of electric signs.

The object of the present invention is to improve upon the method disclosed in Patent No. 1,465,507, granted August 21, 1923, to Harry F. Anderson. The Anderson process consists in rolling out a sheet of glass upon a pallet, and, while the sheet is still plastic, transferring the sheet from the pallet to a die plate having depressions therein corresponding to the shape of the sign character to be produced. Fluid pressure is then employed to force into said depressions the overlying portions of the sheet, whereby a glass plate is produced having a concavo-convex sign character. In this method of making embossed letter plates, the side of the plate which is in contact with the die plate loses, or fails to develop, the desired glazed surface; and it is consequently necessary to subject the letter plate to a further operation in order to impart thereto the glaze which it must have in order to be an efficient and marketable article.

The object of my invention, more particularly stated, is to improve upon the before-mentioned method so as to impart to both surfaces of the letter plate the necessary glaze without the further operation above referred to.

In the accompanying drawings, Figure 1 is a fragmental elevation illustrating an apparatus which may be employed in carrying out my process.

Figure 1:
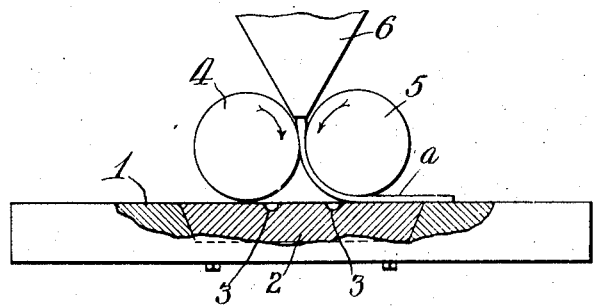
Figure 2:
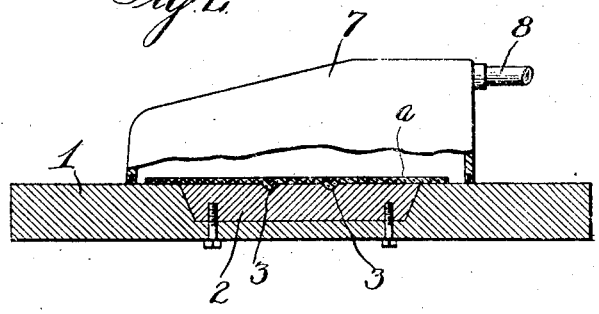
Fig. 2 is a fragmental elevation of an apparatus for applying fluid pressure to the plate in carrying out the final step of the process.
Figure 3:
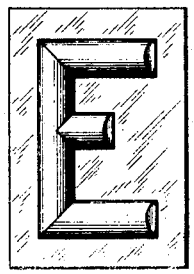
Fig. 3 is a view of a sign letter plate.

In the drawing, 1 denotes a table of any desired form and size, with a mold or die plate 2 mounted therein. The upper surface of the die plate has depressions 3 therein corresponding to the shape of the letter or other sign character to be formed.

Instead of rolling plastic glass into a sheet upon a pallet and then transferring the sheet to the die plate, I deposit the sheet upon the die plate as the sheet is being formed. The means employed in carrying out this portion of the process comprises two rollers 4 and 5 mounted on parallel axes in a suitable carriage (not shown), said carriage being mounted in such a way that it may be drawn across the table. The rollers 4 and 5 are spaced apart a distance equal to the thickness of the sheet of glass to be formed, and the roller 5 is spaced a similar distance from the top of the table and the die plate. The before-mentioned carriage also supports a hopper 6 for the molten glass, the hopper being arranged to discharge its contents between the rollers 4 and 5. The apparatus is so arranged that as the carriage is moved across the table the rollers 4 and 5 rotate in the directions indicated by the arrows, whereby the glass flowing from the hopper is formed into a sheet $a$ which is deposited directly upon the top of the die plate 2. The rollers 4 and 5 become heated by reason of the heat of the molten glass, but they may be further heated by any suitable means, if so desired.

The plastic sheet of glass having been thus formed and laid upon the die plate, fluid pressure is applied to force the sheet into conformity with the die plate. Any suitable means may be employed in carrying out this step of the process, the means herein shown comprising a hood 7 arranged to be lowered onto the table 1 so as to enclose the glass sheet. Compressed air or other pressure fluid is supplied to the hood through a pipe 8. The pressure of the fluid against the glass sheet causes the portions thereof which overlie the depressions of the die plate to be forced down into said depressions, whereby a concavo-convex sign character is formed in the sheet of glass. The completed letter plate is then removed from the die plate 2.

The rolling out of the glass between the rollers 4 and 5 produces a glazed surface on both sides of the sheet. The glaze on the lower side of the sheet is not destroyed by the deposition of the sheet on the die plate, and hence the necessity of imparting a glaze to the embossed outer side of the finished letter plate is obviated, with a consequent material reduction in the cost of the finished product.

I claim as my invention:

1. The method of producing concavo-convex glass sign-character plates which consists in rolling a mass of molten glass into a sheet between two rollers, depositing the sheet directly upon a die plate, and exerting fluid pressure against the sheet to force the latter into conformity with the die plate.

2. The method of producing concavo-convex sign characters which consists of extruding a sheet of glass, laying said sheet directly upon the surface of a die, and exerting fluid pressure against the sheet to force the latter into conformity with the die.

In testimony whereof, I have hereunto affixed my signature.

RAYMOND F. HANCOCK.